(12) United States Patent
Gopakumar et al.

(10) Patent No.: US 8,021,456 B2
(45) Date of Patent: Sep. 20, 2011

(54) FILTER ELEMENT WITH HIGH TEMPERATURE POLYMER RETAINING STRAPS AND METHOD OF MANUFACTURE

(75) Inventors: Thottupurathu Gopakumar, Overland Park, KS (US); Alan Smithies, Overland Park, KS (US); Jason Mei, Overland Park, KS (US)

(73) Assignee: BHA Group, Inc., Kansas City, MI (US)

( * ) Notice: Subject to any disclaimer, the term of this patent is extended or adjusted under 35 U.S.C. 154(b) by 243 days.

(21) Appl. No.: 12/275,988

(22) Filed: Nov. 21, 2008

(65) Prior Publication Data

US 2010/0126130 A1 May 27, 2010

(51) Int. Cl.
*B01D 46/00* (2006.01)
(52) U.S. Cl. ............. 55/498; 55/378; 55/502; 55/522; 156/330.9; 264/279
(58) Field of Classification Search .......... 55/490, 55/491, 492, 495, 496, 497, 498, 500; 264/176.1, 264/242, 259, 271.1, 279, 279.1; 210/232–237, 210/493.1, 493.2, 493.4, 493.5; 156/330.9
See application file for complete search history.

(56) References Cited

U.S. PATENT DOCUMENTS

| | | | | |
|---|---|---|---|---|
| 3,857,688 A | * | 12/1974 | Wisnewski | 55/483 |
| 4,154,688 A | * | 5/1979 | Pall | 210/487 |
| 4,402,830 A | * | 9/1983 | Pall | 210/457 |
| 4,444,575 A | * | 4/1984 | Miller et al. | 96/132 |
| 5,211,846 A | * | 5/1993 | Kott et al. | 210/232 |
| 5,316,677 A | * | 5/1994 | Harms, II | 210/455 |
| 5,350,513 A | * | 9/1994 | Markowitz | 210/264 |
| 5,552,048 A | * | 9/1996 | Miller et al. | 210/489 |
| 5,876,601 A | * | 3/1999 | Geibel et al. | 210/493.1 |
| 5,904,846 A | * | 5/1999 | Clements et al. | 210/321.77 |
| 5,916,435 A | * | 6/1999 | Spearman et al. | 210/132 |
| 6,103,119 A | * | 8/2000 | Clements et al. | 210/493.1 |
| 6,233,790 B1 | * | 5/2001 | Carothers | 24/16 PB |
| 6,508,934 B2 | * | 1/2003 | Van Pelt et al. | 210/232 |
| 6,752,847 B2 | * | 6/2004 | Smithies | 55/521 |
| 6,787,031 B2 | * | 9/2004 | Van Pelt et al. | 210/232 |
| 6,911,144 B2 | * | 6/2005 | Van Pelt et al. | 210/232 |
| 7,070,642 B2 | * | 7/2006 | Scott et al. | 55/498 |
| 7,662,203 B2 | * | 2/2010 | Scott et al. | 55/498 |
| 2003/0110745 A1 | * | 6/2003 | Smithies | 55/524 |
| 2003/0182911 A1 | * | 10/2003 | Schrage | 55/498 |
| 2003/0192294 A1 | * | 10/2003 | Smithies | 55/521 |
| 2004/0163372 A1 | * | 8/2004 | Nguyen | 55/497 |
| 2004/0168419 A1 | * | 9/2004 | Smithies | 55/521 |
| 2004/0237483 A1 | * | 12/2004 | Clements | 55/341.1 |
| 2006/0263603 A1 | * | 11/2006 | Kondo et al. | 428/407 |
| 2007/0175573 A1 | * | 8/2007 | Fox et al. | 156/196 |
| 2008/0072553 A1 | * | 3/2008 | Smithies et al. | 55/428 |
| 2008/0078152 A1 | * | 4/2008 | Smithies | 55/524 |

* cited by examiner

*Primary Examiner* — Duane Smith
*Assistant Examiner* — Thomas McKenzie
(74) *Attorney, Agent, or Firm* — Armstrong Teasdale LLP

(57) ABSTRACT

A filter element for removing particles from a particulate laden fluid stream includes, in an exemplary embodiment, a filtration media formed into a tubular configuration and that a plurality of circumferentially spaced apart pleats. The filter element also includes at least one melt-extruded retention strap extending circumferentially around the filtration media to limit radial movement of the filtration media at operating temperatures up to about 500° F. Each melt-extruded retention strap is formed from a melt extrudable amorphous thermoplastic polyimide.

16 Claims, 3 Drawing Sheets

FILTER ELEMENT WITH HIGH TEMPERATURE POLYMER RETAINING STRAPS AND METHOD OF MANUFACTURE

BACKGROUND OF THE INVENTION

The field of the invention relates generally to high temperature filter elements, and more particularly to high temperature filter elements that include high temperature polymer retaining straps.

Some known filter elements have pleated filtration media for filtering particulates from a particulate laden fluid stream moving in one direction through the filter element. Some known particulate laden fluid streams include hot gas streams associated with coal-fired boilers, cement kilns, and asphalt plants. Such hot gas streams may have extended periods of time the gas stream temperatures range from approximately 275° F. to 500° F. (approximately 135° C. to 260° C.). Also, filter elements are often subjected to cleaning fluid pulses moving for short periods of time through the filtration media in a direction opposite to the direction that the particulate laden fluid stream moves. Such filter elements are referred to as "pulse pleat" filter elements. In order to prevent the filtration media from excessive movement during exposure to the cleaning fluid pulses, some filter elements have retention straps that encircle portions of the pulse pleat filter element.

Some known retention straps for pulse pleat filter elements are difficult to install onto a filter element and may not remain in the relative axial location that they are initially placed. For example, some known retention straps must be manually wrapped about the filtration media of the filter element. Such retention straps are typically tightened manually and the ends of the retention straps are overlapped. The ends of the retention strap are then adhered or fastened together while a desired tension is manually maintained on the retention strap.

Maintaining the retention straps in a pre-determined relative axial location along the filter element facilitates protecting the filtration media from excessive movement during exposure to the cleaning fluid pulses. This is typically accomplished by the use of known adhesives. However, some of the adhesives used on the retention straps may have shortened life expectancies, particularly at elevated temperatures of about 375° F. to 500° F. (about 190° C. to 260° F.) that are used in some hot gas streams industrial applications

BRIEF DESCRIPTION OF THE INVENTION

In one aspect, a filter element for removing particles from a particulate laden fluid stream is provided. The filter element includes a filtration media formed into a tubular configuration and that a plurality of circumferentially spaced apart pleats. The filter element also includes at least one melt-extruded retention strap extending circumferentially around the filtration media to limit radial movement of the filtration media at operating temperatures up to about 500° F. Each melt-extruded retention strap is formed from a melt extrudable amorphous thermoplastic polyimide.

In another aspect, a method of fabricating a filter element for removing particles from a particulate laden fluid stream is provided. The method includes providing a filtration media formed into a tubular configuration and including a plurality of circumferentially spaced apart pleats. The method also includes extruding an amorphous thermoplastic polyimide circumferentially around a portion of the filtration media to form a retention strap that extends circumferentially around the filtration media to limit radial movement of the filtration media at operating temperatures up to about 500° F.

DETAILED DESCRIPTION OF THE INVENTION

A filter element that includes high temperature polymer retention straps and a method of manufacturing the filter element is described below in detail. The filter element is suitable for use in hot gas industrial filtration applications up to about 500° F. (about 260° C.). The retention straps are formed from extruded amorphous thermoplastic polyimide polymers or from blends of amorphous thermoplastic polyimide polymers with polyetherimide polymers or polyetheretherketone polymers. The retention straps provide for a rigid stable condition of the pleated media under mechanical forces found in pulse-jet filter baghouse environments. Also, the extruded polymer retention straps keep the individual pleats of the filter media separate and stable. In addition, the stability of the pleated media from the melt extruded retaining straps increases the filter media life and performance by reducing flex and stress.

Figure 1:
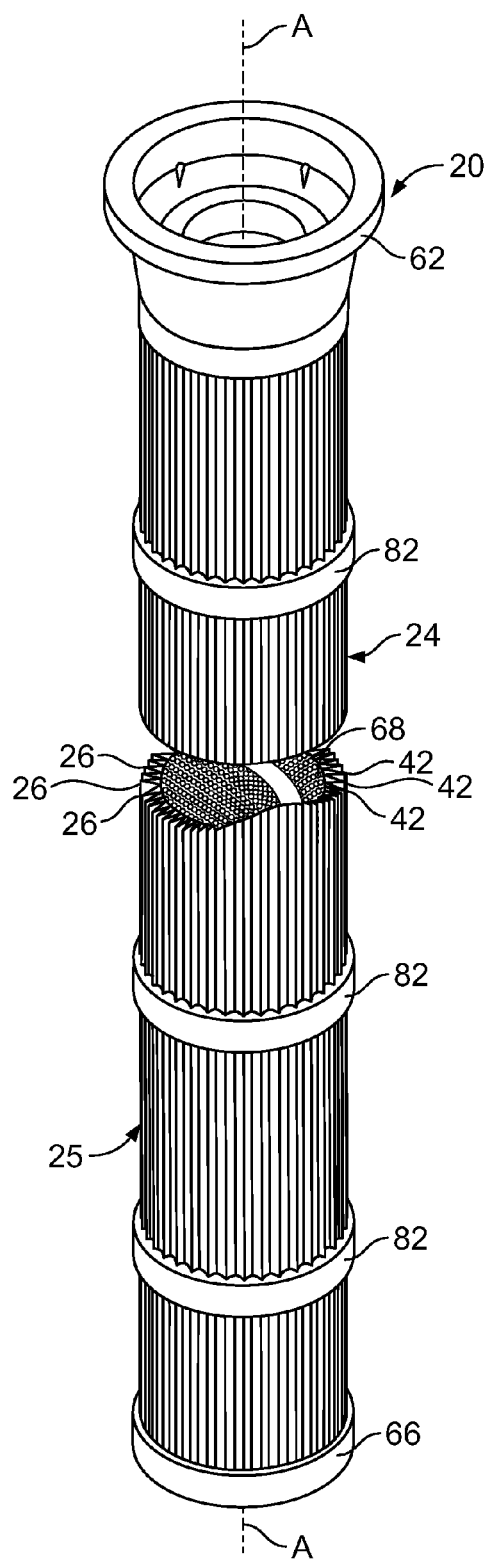
FIG. 1 is a schematic perspective view of an exemplary filter element.
Figure 2:
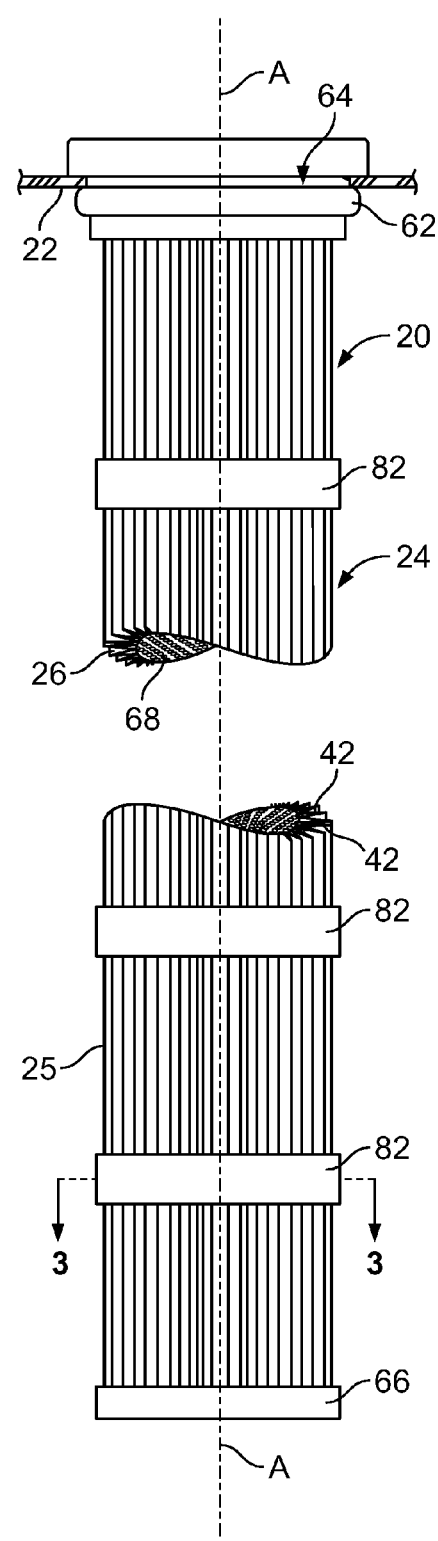
FIG. 2 is a schematic side view of the filter element shown in FIG. 1.
Figure 3:
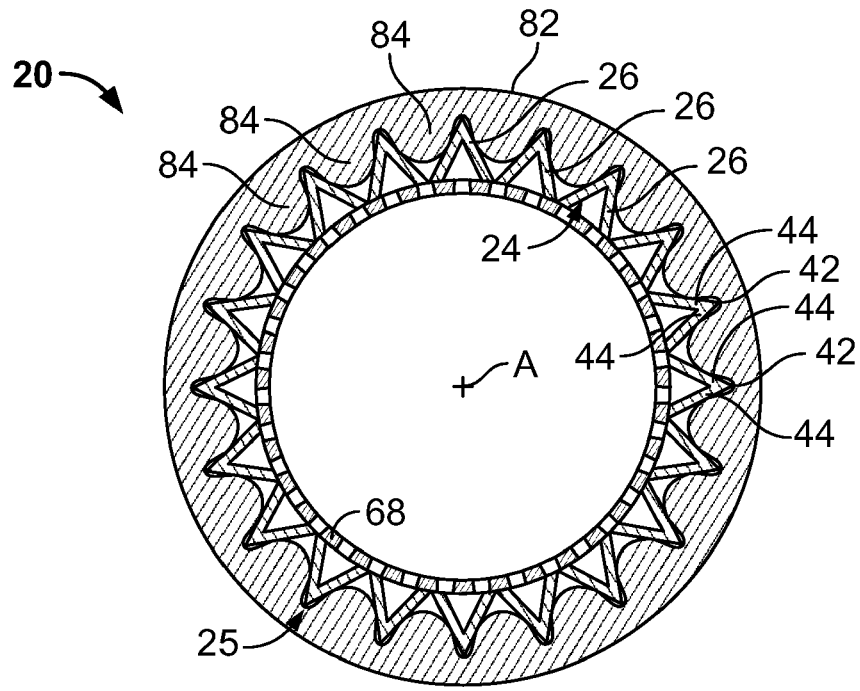
FIG. 3 is a cross-sectional schematic view of the filter element shown in FIG. 2 taken along line 3-3.

Referring to the drawings, FIG. 1 is a schematic perspective view of an exemplary filter element 20, FIG. 2 is a schematic side view of filter element 20, and FIG. 3 is a cross-sectional schematic view of filter element 20. Filter element 20 may be used to remove particulates from a particulate laden fluid stream that flows in one direction through filter element 20. In the exemplary embodiment, filter element 20 is particularly suitable for use in air pollution control applications that includes, but is not limited to, a bag house substantially removing particulate matter from a flue gas stream associated with a coal-fired furnace. Moreover, in the exemplary embodiment, filter element 20 is operably attached to a tube sheet 22 positioned within the plenum of the baghouse.

Alternatively, filter element 20 may be used in any application that requires particulate removal from a fluid stream. Furthermore, filter element 20 is a "pulse pleat" type of filter element that is periodically subjected to pulsed cleaning fluid flowing in an opposite direction to the direction that the particulate-laden fluid stream flows. For example, in the exemplary embodiment, such pulsed cleaning fluid is compressed, high-pressure, substantially particulate-free air. Alternatively, the pulsed cleaning fluid is any fluid that facilitates operation of filter element 20 as described herein. Filter element 20 may be subjected to over 300,000 cleaning pulses over its service life of approximately 3 years.

Filter element 20 includes filtration media 24 that is formed into a tubular configuration that is generally cylindrical, with a longitudinal central axis A. Filtration media 24 includes a plurality of pleats 26 which are circumferentially spaced about a periphery 25 of filter element 20. Each pleat 26 includes a tip 42 formed at its radially outermost location and a pair of sides 44 extending radially inward from each of tips 42.

A mounting structure 62 is located at a first axial end portion of filter element 20. Mounting structure 62 facilitates mounting and sealing filter element 20 at an opening 64 that is formed in tube sheet 22. Opening 64 facilitates flow of particulate-laden fluid and pulse fluid streams through filter element 20. An end cap 66 is located at an axially opposite second axial end portion of filter element 20. In the exemplary embodiment, mounting structure 62 and end cap 66 are made of metal materials that include, but are not limited to, a galvanized steel material. Alternatively, structure 62 and end cap 66 are fabricated of any material that facilitates operation of filter element 20 as described herein. Filtration media 24 is positioned and maintained in the generally tubular configuration by mounting structure 62 and end cap 66. A permeable support 68 is located radially inward of filtration media 24 to prevent inward collapse of filtration media 24 during exposure to the particulate-laden fluid stream that is to be filtered.

Pleats 26 in filtration media 24 are not necessarily stiff and strong, thus, without a means of restraint, pleats 26 are prone to radially outward movement during a flow of a cleaning fluid pulse through media 24. Excessive radial outward movement of filtration media 24 may reduce a filtration effectiveness of filter element 20. Adjacent pleats 26 may also collapse and temporarily engage one another during a cleaning pulse or during a typical filtration cycle. When adjacent pleats 26 engage one another, there is a chance that the cleaning pulse or filtration operation will not be completely effective because gas flow through that portion of filtration media 24 may be temporarily blocked. Filter element 20 includes a plurality of retention straps 82 to restrain filtration media 24 about periphery 25 to facilitate reducing excessive radial movement of filtration media 24 or collapse of pleats 26. Retention straps 82 extend around periphery 25 of filter element, and are positioned equidistant along the length of filter element 20. Retention straps 82 limit radial movement of filtration media 24 in the radially outward direction when subjected to the periodic cleaning fluid stream, and thus, limit the possibility of pleat blow-out or catastrophic deformation. Retention straps 82 also establish a pre-determined spacing apart and maintaining adjacent pleats 26 at the pre-determined spacing around periphery 25 of filter element 20.

In the exemplary embodiment, each retention strap 82 is fabricated from a melt-extrudable polymer material capable of withstanding relatively high-temperature operation, in one embodiment, of up to about 500° F. (about 260° C.), and in another embodiment from about 375° F. to about 500° F. (about 190° C. to about 260° C.). Such materials have sufficient strength, fatigue resistance, chemical resistance and temperature resistance to limit excessive radial movement of filtration media 24 during a cleaning pulse and maintaining tips 42 of pleats 26 at a pre-determined spacing. For example, such melt-extrudable polymer material facilitates extending a pre-determined service life of retention strap 82 within environments that have elevated operating temperatures up to about 500° F. (about 260° C.), for example, from about 375° F. to about 500° F. (about 190° C. to about 260° C.). Moreover, retention strap 82 facilitates extending a pre-determined service life within severe operating environments that further include, but are not limited to, routine exposure to moisture and aggressive chemicals.

In the exemplary embodiment, retention strap 82 is fabricated from melt-extrudable amorphous thermoplastic polyimide polymers, including blends or copolymers, of melt-extrudable amorphous thermoplastic polyimide polymers and other high temperature polymers, for example, polyetherimides and polyetheretherketones (PEEK). In one embodiment, a blend of amorphous thermoplastic polyimide and polyetherimide or PEEK includes about 40 percent to less than about 100 percent, by weight, of the amorphous thermoplastic polyimide, in another embodiment, the blend includes about 60 percent to less than about 100 percent, by weight, of the amorphous thermoplastic polyimide, and in another embodiment, the blend includes about 80 percent to less than about 100 percent, by weight, of the amorphous thermoplastic polyimide. Melt-extrudable amorphous thermoplastic polyimide polymers are commercially available from SABIC Innovative Plastics IP BV under the trademark EXTEM®. Melt-extrudable polyetherimide polymers are commercially available from SABIC Innovative Plastics IP BV under the trademark ULTEM®. PEEK polymers are commercially available from Victrex plc. One particularly suitable copolymer of amorphous thermoplastic polyimide and melt-extrudable polyetherimide is EXTEM® EXUM VH0173 copolymer commercially available from SABIC Innovative Plastics IP BV. Table 1 lists the physical properties of EXTEM® EXUM VH0173 copolymer.

TABLE 1

| PROPERTY | UNIT | VH0173 |
| --- | --- | --- |
| Tensile Modulus | MPa | 3430 |
| Tensile Strength @ Yield | MPa | 96.3 |
| Elongation @ Break | % | 42.7 |
| Flexural Modulus | MPa | 2840 |
| Flexural Stress @ Yield | MPa | 147 |
| Heat Deflection Temp. | ° C. | 243 |
| Notched Izod | Ft-lb/in | 1.94 |
| Rev-notched Impact Strength | Ft-lb/in | 32.0 |
| Rev-notched % Ductility | % | 80 |

In the exemplary embodiment, retention strap 82 can withstand over 300,000 cleaning pulses and continue to function while continuously immersed in an environment that has a temperature up to about 500° F. (about 260° C.) with a service life of approximately three years without losing its strength and without moving axially along filter element 20 from the position it was initially placed.

Retention strap 82 extends around periphery 25 and engages and is adhered to tips 42 of pleats 26. Also, retention strap 82 can be adhered to sides 44 of pleats 26. Such engagement minimizes radially outward movement of tips 42 of pleats 26 to facilitate maintaining pleats 26 at their pre-determined spacing without collapsing against one another during exposure to the pressure and flow of the cleaning fluid stream. Such adherence facilitates retention strap 82 remaining in the relative axial location it was originally placed throughout its service life.

In the exemplary embodiment, retention strap 82 is applied to filter element 20 during an extrusion operation. Retention strap 82 is adhered to filtration media 24 during the extrusion operation so it does not move along periphery 25 of filter element 20 in a direction parallel to axis A. Moreover, during the extrusion operation, a plurality of portions 84 of retention strap 82 are formed which extend at least partially into a region between each of adjacent pleats 26. Forming portions 84 facilitates forming some structure between pleats 26 thereby mitigating a tendency for adjacent pleats 26 from engaging each other and collapsing. Also, portions 84 permit retention strap 82 to engage and adhere to tips 42 and/or sides 44 of pleats 26 as described above so that retention strap 82 remains in the pre-determined axial position. Subsequent to application to periphery 25, the polymer material of retention strap 82 is cooled until hardened so that retention strap 82 has a hardness and strength sufficient to withstand the operating environment it will be exposed to during its service life. The mitigation of longitudinal movement along periphery 25 of retention strap 82 facilitates the elimination of mechanical wear and abrasion of filtration media 24. Such abrasion may typically be caused by excessive and deleterious longitudinal and radial movement between strap 82 and media 24 during standard flow operations and pulsed operations as described herein.

Figure 4:
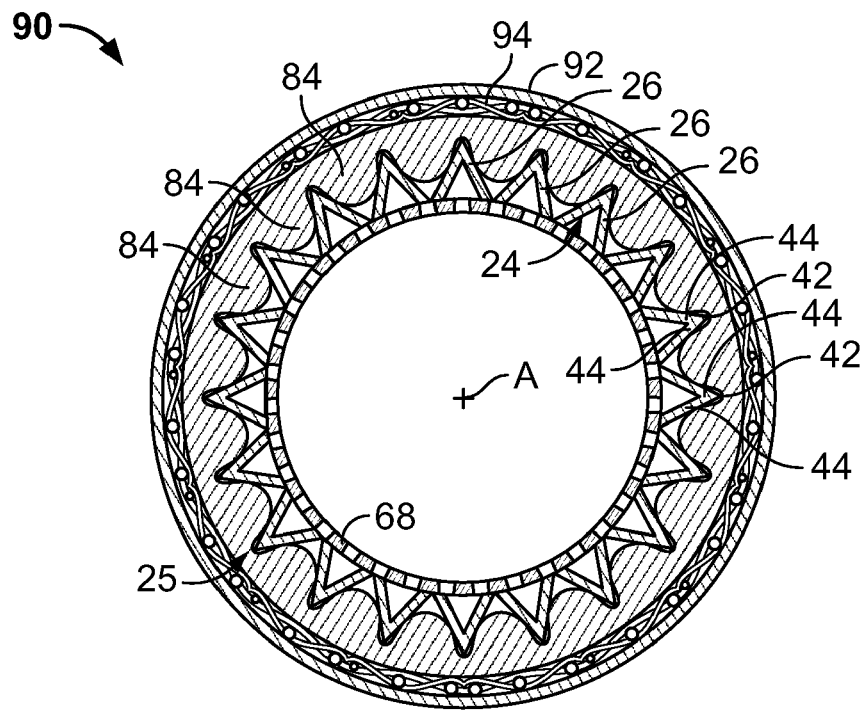
FIG. 4 is a cross-sectional schematic view of an alternative filter element.

FIG. 4 is a cross-sectional schematic view of an alternative filter element 90. Filter element 90 is similar to filter element 20 with the exception that filter element 90 includes an alternative retention strap 92 according to another embodiment of the invention. Retention strap 92 includes a reinforcement structure 94 that is fabricated with any suitable material including, for example, a woven glass fiber mat, and other suitable textiles. Reinforcement structure 94 is introduced during the extrusion operation. For example, in the exemplary embodiment, reinforcement structure 94 is introduced approximately immediately subsequent to formation of a single extrusion pass by pressing structure 94 into the polymer extrudate. Alternatively, structure 94 is introduced between any two separate extrusion passes.

Figure 5:
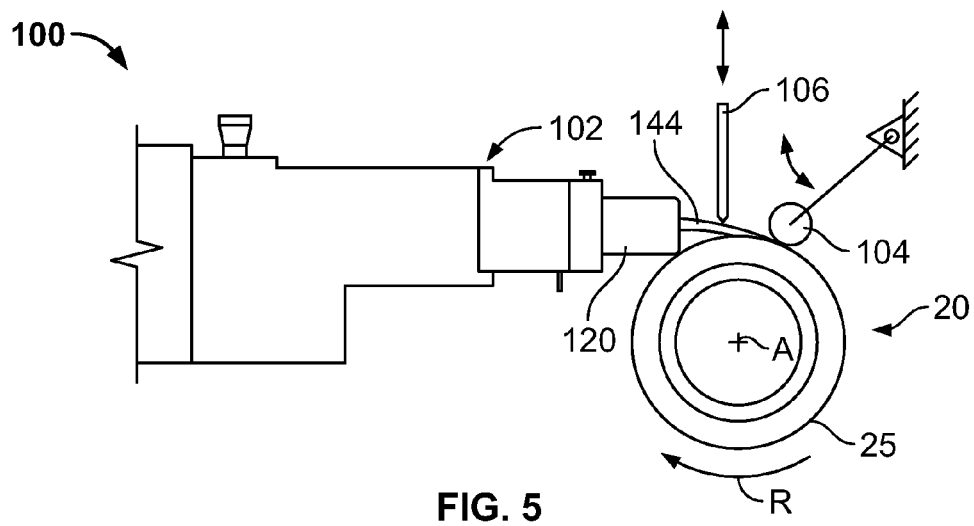
FIG. 5 is a schematic side view of an exemplary extrusion equipment configuration that can be used to fabricate the filter elements shown in FIGS. 1-4.
Figure 6:
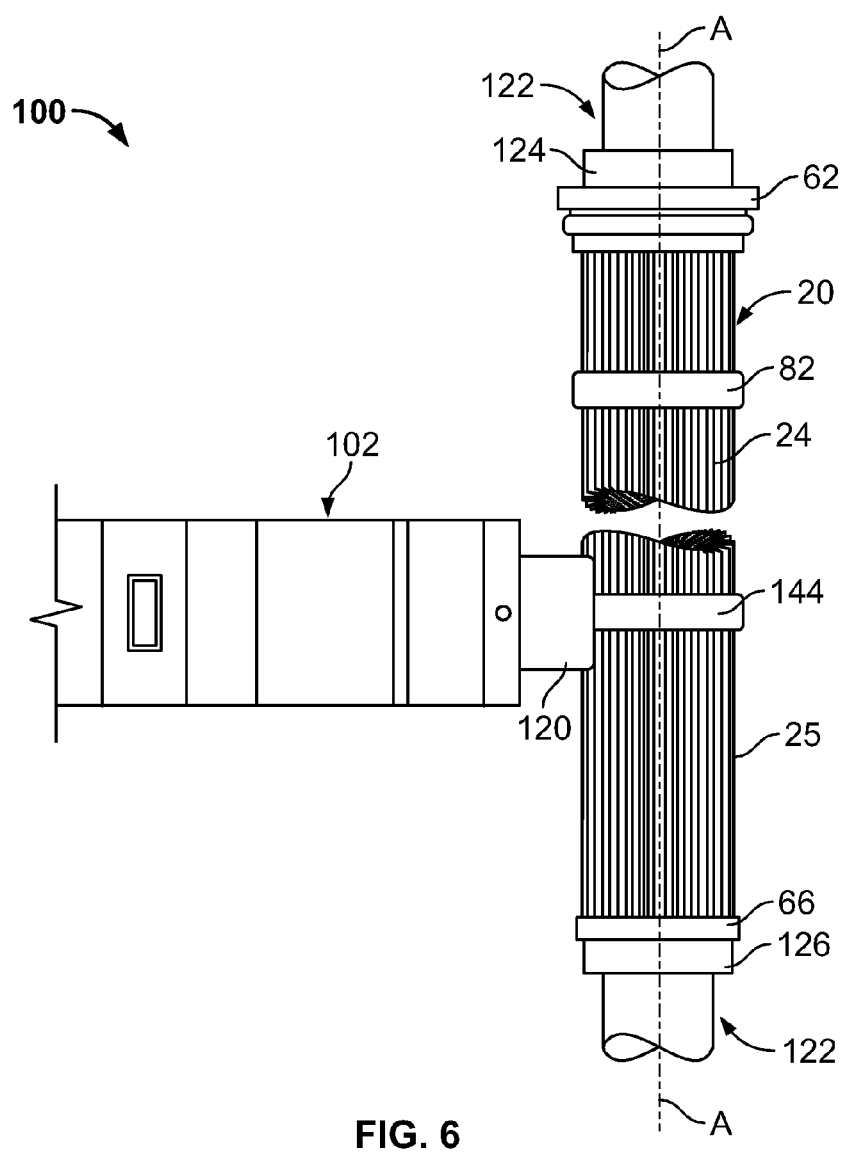
FIG. 6 is a schematic overhead view of the extrusion equipment configuration shown in FIG. 5.

FIG. 5 is a schematic side view of an exemplary polymer application apparatus 100 that can be used to fabricate filter elements 20 and 90 (shown in FIGS. 1-4). FIG. 6 is a schematic overhead view of polymer application apparatus 100. Polymer application apparatus 100 includes an extruder 102, a pivotable application roller 104 positioned in opposition to extruder 102, a cutoff mechanism 106 positioned between extruder 102 and roller 104, and an application barrel 120 coupled in flow communication with a source of hot, melted high-temperature melt-extrudable polymer material. In another embodiment, apparatus 100 also includes a reinforcement applicator for applying reinforcing structure 94 (shown in FIG. 4).

Polymer application apparatus 100 also includes a support mechanism 122 that holds and rotates filter element 20 during application of an extruded retention strap 82. Support mechanism 122 includes a mounting structure holder 124 and an end cap holder 126. Mounting structure holder 124 is sized to fit within and supports mounting structure 62 of filter element 20 with a friction fit. End cap holder 126 is sized to support end cap 66 of filter element 20 via a friction fit. Support mechanism 122 positions filter element 20 so longitudinal central axis A of filter element 20 extends in a direction normal to a barrel 120 of extruder 102. Either or both of the holders 124 or 126 are rotatably coupled with a drive mechanism to rotate supported filter element 20 under barrel 120 of extruder 102, in a clockwise direction as illustrated by the arrow R illustrated in FIG. 5.

A method of fabricating filter element 20 with retention strap 82 includes providing filtration media 24 formed into a plurality of pleats 26 having a substantially tubular configuration with a pre-determined circumferential spacing between each of the plurality of pleats 26. The method also includes attaching at least one retention strap 82 to filtration media 24.

Filter element 20 is held in proximity to extruder 102 by a support mechanism 122. The filter element 20 is rotated under barrel 120 of extruder 102 while a band of amorphous thermoplastic polyimide polymer extrudate 144 is applied to periphery 25 of filter element 20. Application roller 104 is loaded to a pre-determined force so portions 84 of the polymer extrudate 144 is forced in between adjacent pleats 26 of filtration media 24. Application roller 104 also forces polymer extrudate 144 to contact tips 42 and sides 44 of pleats 26 to engage and adhere to filtration media 24. Polymer extrudate 144 is subsequently cooled to harden to form retention strap 82.

In an alternative embodiment, reinforcement structure 94 is introduced into retention strap 92. One method of introducing reinforcement structure 94 into retention strap 92 is to apply a first layer of polymer extrudate 144 to periphery 25. Reinforcement structure 94 is introduced into extrudate 144 by the optional reinforcement applicator. Application roller 104 depresses textile reinforcement structure 94 into the first layer of polymer extrudate 144. Subsequent layers of polymer extrudate 144 are then formed over and around reinforcement structure 94. Another method of introducing reinforcement structure 94 into retention strap 92 to place reinforcement structure 94 between any two separate layers of polymer extrudate 144 using substantially similar methods as described above.

When circumferentially opposite ends of polymer extrudate 144 overlap, cutoff mechanism 106 is activated to sever polymer extrudate 144 moving substantially parallel to axis A as illustrated by the double arrows in FIG. 5. Application roller 104 then forms a unified one-piece retention strap 82 (or 90) that substantially remains in the pre-determined axial position and facilitates support of pleats 26 and prevention of engagement between adjacent pleats 26.

Exemplary embodiments of high-temperature straps as associated with filter elements are described above in detail. The methods, apparatus and systems are not limited to the specific embodiments described herein nor to the specific illustrated filter elements and straps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A filter element comprising:
  a filtration media formed into a tubular configuration and comprising a plurality of circumferentially spaced apart pleats;
  a mounting structure at a first axial end of said filter element;
  an end cap at a second axial end of said filter element, said filtration media extending between said mounting structure and said end cap; and
  at least one melt-extruded retention strap extending circumferentially around said filtration media to limit radial movement of said filtration media at operating temperatures up to about 500° F., said at least one melt-extruded retention strap comprising a melt extrudable amorphous thermoplastic polyimide, and said at least one melt-extruded retention strap positioned between said first axial end of said filter element and said second axial end of said filter element;
  said amorphous thermoplastic polyimide comprising a copolymer of, or a blend of, an amorphous thermoplastic polyimide polymer and another polymer selected from the group consisting of polyetherimide polymers and polyetheretherketone polymers.

2. A filter element in accordance with claim 1 wherein said copolymer or blend comprises about 40 percent to less than about 100 percent, by weight, of said amorphous thermoplastic polyimide polymer.

3. A filter element in accordance with claim 1 wherein said copolymer or blend comprises about 80 percent to less than about 100 percent, by weight, of said amorphous thermoplastic polyimide polymer.

4. A filter element in accordance with claim 1 wherein at least one of said plurality of pleats comprises a pair of substantially oblique sides forming at least one tip, said retention strap coupled to at least one of said tips.

5. A filter element in accordance with claim 4 wherein said at least one retention strap is coupled to at least one of said substantially oblique sides.

6. A filter element in accordance with claim 1 wherein said at least one retention strap comprises a portion extending between adjacent pleats.

7. A filter element in accordance with claim 1 wherein said at least one retention strap further comprises a reinforcement structure.

8. A filter element in accordance with claim 1 wherein at least one said melt-extruded retention strap extends circumferentially around said filtration media to limit radial movement of said filtration media at operating temperatures from about 375° F. to about 500° F.

9. A method of fabricating a filter element, said method comprising:
  providing a filtration media formed into a tubular configuration and comprising a plurality of circumferentially spaced apart pleats;
  coupling a mounting structure at a first axial end of the filter element; and
  coupling an end cap at a second axial end of the filter element, the filtration media extending between the mounting structure and the end cap; and
  extruding an amorphous thermoplastic polyimide circumferentially around a portion of the filtration media to form a retention strap that extends circumferentially around said filtration media to limit radial movement of said filtration media at operating temperatures up to about 500° F.
  wherein the amorphous thermoplastic polyimide comprises a copolymer of, or a blend of, an amorphous thermoplastic polyimide polymer and another polymer selected from the group consisting of polyetherimide polymers and polyetheretherketone polymers.

10. A method in accordance with claim 9 wherein the copolymer or the blend comprises about 40 percent to less than about 100 percent, by weight, of the amorphous thermoplastic polyimide polymer.

11. A method in accordance with claim 9 wherein the copolymer or the blend comprises about 80 percent to less than about 100 percent, by weight, of the amorphous thermoplastic polyimide polymer.

12. A method in accordance with claim 9 wherein at least one of the plurality of pleats comprises a pair of substantially oblique sides forming at least one tip, said extruding an amorphous thermoplastic polyimide circumferentially around a portion of the filtration media comprises extruding an amorphous thermoplastic polyimide circumferentially around a portion of the filtration media so as to couple the retention strap to at least one of the tips.

13. A method in accordance with claim 12 wherein extruding an amorphous thermoplastic polyimide circumferentially around a portion of the filtration media comprises extruding an amorphous thermoplastic polyimide circumferentially around a portion of the filtration media so as to couple the retention strap to at least one of the oblique sides of the plurality of pleats.

14. A method in accordance with claim 9 wherein extruding an amorphous thermoplastic polyimide circumferentially around a portion of the filtration media comprises extruding an amorphous thermoplastic polyimide circumferentially around a portion of the filtration media so that the retention strap comprises a portion extending between adjacent pleats.

15. A method in accordance with claim 9 further comprises applying a reinforcement structure to the extruded amorphous thermoplastic polyimide to form a reinforced retention strap.

16. A method in accordance with claim 9 wherein extruding an amorphous thermoplastic polyimide circumferentially around a portion of the filtration media comprises extruding an amorphous thermoplastic polyimide circumferentially around a portion of the filtration media to form a retention strap that extends circumferentially around said filtration media to limit radial movement of said filtration media at operating temperatures from about 375° F. to about 500° F.

* * * * *